D. P. CHILD.
METER SERVICE BOX AND HOUSING FOR CURB COCKS.
APPLICATION FILED MAR. 5, 1918.
1,346,879.
Patented July 20, 1920.
3 SHEETS—SHEET 1.
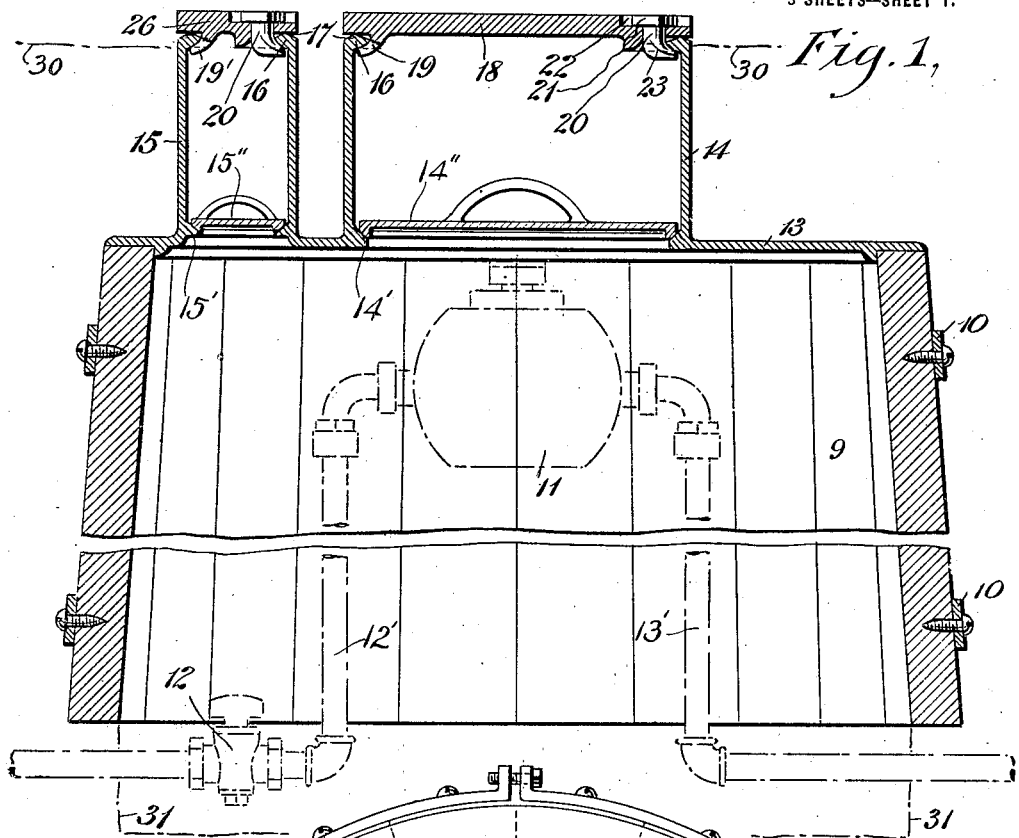
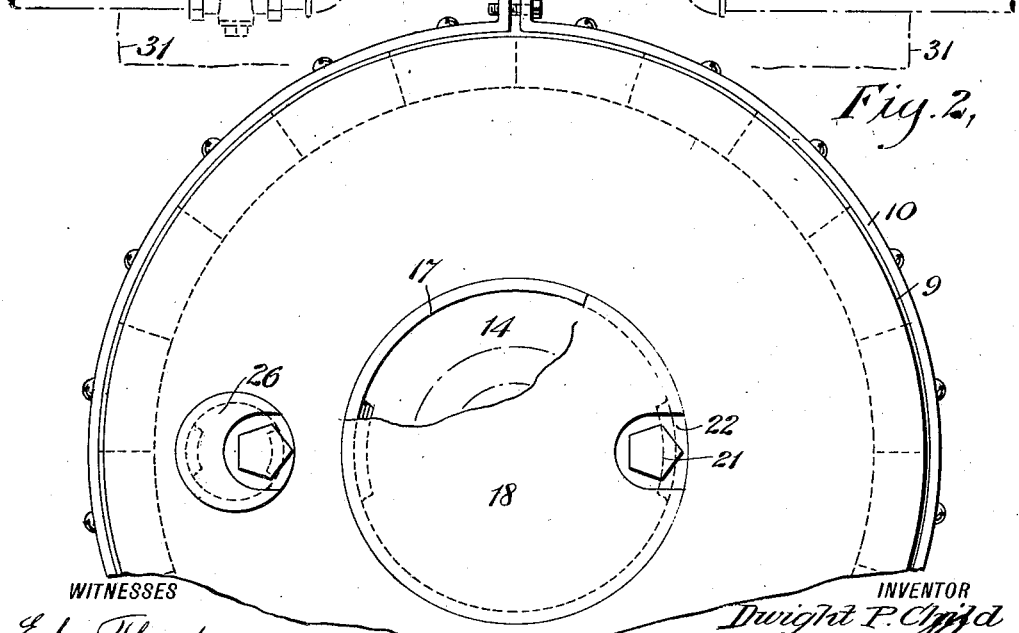
WITNESSES
Edw. Thorpe
B. Joffe
INVENTOR
Dwight P. Child
BY
ATTORNEYS

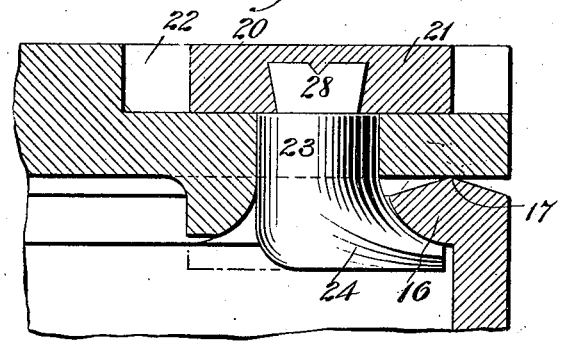
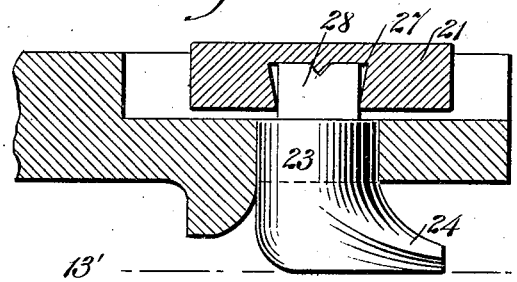
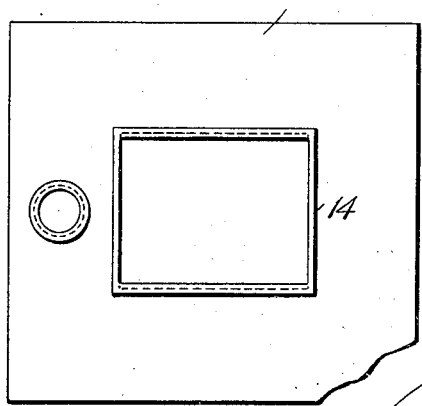
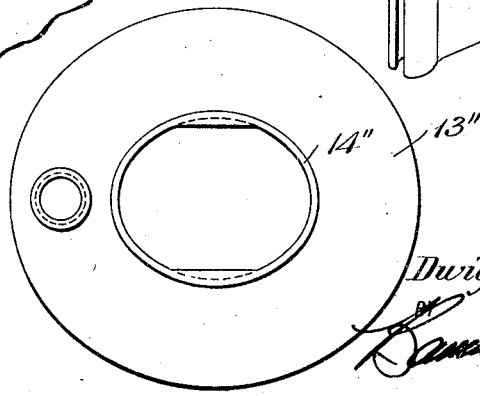
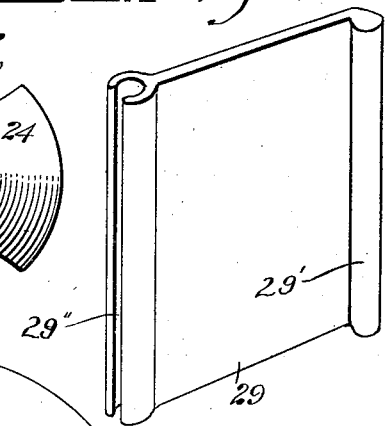

D. P. CHILD.
METER SERVICE BOX AND HOUSING FOR CURB COCKS.
APPLICATION FILED MAR. 5, 1918.

1,346,879.

Patented July 20, 1920.
3 SHEETS—SHEET 3.

WITNESSES
Edw. Thorpe
B. Joffe

INVENTOR
D. P. Child
BY
ATTORNEYS

UNITED STATES PATENT OFFICE.

DWIGHT P. CHILD, OF QUINCY, ILLINOIS.

METER SERVICE-BOX AND HOUSING FOR CURB-COCKS.

1,346,879.  Specification of Letters Patent.  Patented July 20, 1920.

Application filed March 5, 1918. Serial No. 220,564.

*To all whom it may concern:*

Be it known that I, DWIGHT P. CHILD, a citizen of the United States, residing at Quincy, in the county of Adams and State of Illinois, have invented certain new and useful Improvements in Meter Service-Boxes and Housings for Curb-Cocks, of which the following is a specification.

The present invention has to do with the construction of meter service boxes, housings for curb cocks, valves, and similar structures. Certain of the features of the invention will be more easily understood, and their significance more readily appreciated, from a general understanding of the service which they perform and the conditions under which they are used. These structures are used in housing water service connections, but they may also be used on services supplying gas or other utilities. In order, however, that the significance of certain of the features may be more readily understood, I will describe certain of the operating conditions as the same exist in connection with water service. However, I wish it understood that in so doing I do not intend to limit myself to the use of these features in connection with water service, but that I explain such construction and such conditions simply by way of example and not as a matter of limitation.

The service pipes leading from the street mains to the houses or other water consumers are generally provided with cocks or valves, so that the water supply can be controlled outside of the house. It is quite customary to locate these cocks close to the curb lines, and they are frequently designated as curb cocks. It is also frequently the practice to place a meter in the service for the purpose of measuring the quantity of water consumed.

The meters are usually read at regular intervals or periods by a corps or force of men designated for that purpose, and for this purpose the meters must be so located that they can be conveniently reached by the men so designated. For this purpose it is not necessary that access should be gained to the curb cocks. On the other hand, it is necessary for plumbers and other operatives to gain access to the curb cocks from time to time so as to shut off or turn on the water in the various service pipes, but for this purpose it is quite unnecessary that these operatives should have access to the meters. It is, therefore, desirable to so arrange things that the meters can be reached independently of the curb cocks and vice-versa, thereby segregating or separating the two installations to a greater or less extent.

It is nevertheless very desirable to so arrange installation that service pipes, meters, and curb cocks, shall be thoroughly protected from frost, and from interference by unauthorized persons. It is also desirable to place both the curb cock and the meter within some structure or housing so as to simplify and cheapen the cost of installation and also simplify the connections and parts necessary to effect the connections.

One of the objects of the invention is to provide a housing such that the foregoing results may be readily secured at a minimum cost of installation and in a very simple manner. In this connection another object is to secure this result by the provision of a special form of cover for the housing, said cover being of such form that it will permit access independently to the meter and to the curb cock, while to a greater or less extent preventing tampering with or the interference of one or the other as the case may be, unless the person is authorized to gain access to both instrumentalities.

Another feature of the invention has to do with the use of such special form of cover in conjunction with a single chamber or box, thereby greatly simplifying and reducing the cost of the installation, and making it possible to standardize the manufacture of those parts which are shop-made.

Another feature in this connection is the following: Where a separate box is used for the curb cock, the same is of relatively small size and it is frequently very difficult to find or locate the lid thereof. This entails a loss of time and labor, besides which it sometimes happens that certain of the curb cocks are overlooked when shutting off the water or other utility in a given neighborhood. By the use of certain of the features of the present invention this possibility will be greatly reduced if not entirely eliminated. Still another feature in this connection is that is frequently happens that the small curb cock boxes become filled with dirt, sticks, stones, or other foreign matter which make it practically impossible to operate the curb cock without a great deal of labor, whereas by the use of certain of the features of this invention this difficulty is entirely eliminated. Furthermore, where the small curb cock box is used, it is sometimes overlooked in raising street grades, on account of its small size, whereas this possibility is entirely eliminated by the use of certain of the features of this invention.

Another feature of the invention has to do with the manner and mechanism whereby the lids are secured to the covers of the housings, and in this connection an object is to so construct this locking mechanism that the lid will be very firmly drawn home and secured in position. Another object in this connection is to so arrange the locking device that, by reversing its position, it will be caused to force the lid away from the cover or housing under considerable pressure, thereby making it possible to easily remove the lid even in those cases where the parts are frosted, frozen, or rusted together, or caused to stick in any other manner. This will eliminate the use of the pick, shovel, or other instrumentality for prying the lid loose.

Another feature of the invention has to do with the construction of the openings in such form that the meters can be most readily reached and manipulated. In this connection I have discovered the fact that a rectangular opening is very well adapted for use in connection with this type of housing for the reason, among other things, that it permits the workman to reach his arms down into the housing through the corners of the opening, thereby giving the benefit of a maximum amount of arm separation in conjunction with a minimum area of opening. If the opening were of circular form, such as has been customary in the past, it would be necessary to make the diameter thereof as great as the distance between diagonally opposite corners of a rectangular opening, so that the area of the circular opening would be considerably larger than necessary. It is, of course, desirable to keep the area down as much as possible, since the radiation of heat from the housing or vault will be directly controlled or influenced by the area of lid surface exposed to the atmosphere.

Other objects are to provide a construction giving a maximum protection against frost by the use of a dead air space; and to increase the radiation of heat from the earth into the interior of the vault or housing by giving a maximum area of earth exposed in the bottom portion of the housing.

Other objects and features of the invention will appear from a detailed description of the same which consists in the features of construction and combinations of parts hereinafter described and claimed.

In the drawings:

Figure 1 shows a vertical section through a housing, cover, and lids embodying the features of the present invention, the cover therein illustrated having two necks located respectively at the proper positions with respect to the meter and to the service cock, the arrangement shown being of the circular form;

Fig. 2 is a plan view corresponding to Fig. 1;

Fig. 3 is an enlarged detail section through the locking device of the construction shown in Figs. 1 and 2, the lid being in closed or locked position;

Fig. 4 shows a detail section through the cam block on the lid, the nut being set into position but not secured to the cam block;

Fig. 5 shows a plan view of the cam block itself;

Fig. 6 shows a plan view of a lid for a rectangular housing, the main or meter neck being rectangular in form;

Fig. 7 is a view similar to Fig. 6 with the exception that it shows a cover for an oval-shaped housing, the meter neck being oval in shape;

Fig. 8 shows in perspective a block or wall section of particular form, such as may be used in building up the body portion of the housing;

Figure 9:
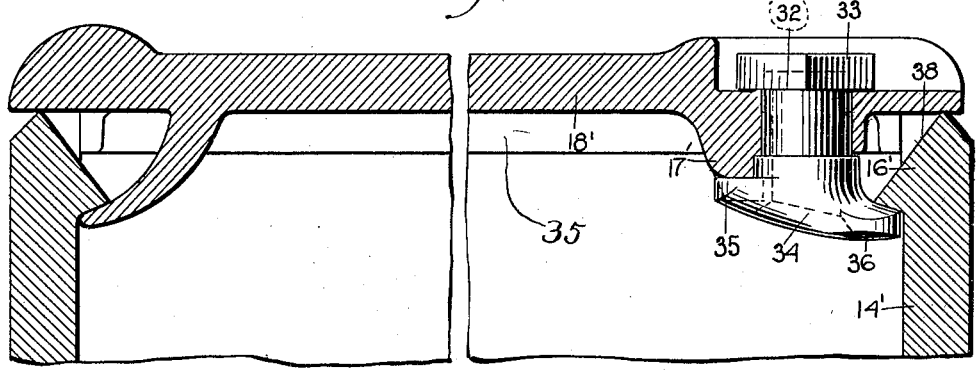
Fig. 9 shows a vertical section through another form of lid and locking device, the same being in locked position.

Referring in the first place to Figs. 1 and 2, the meter housing therein illustrated is of the circular form, and it is shown as being built up from staves of creosoted wood 9 held together in barrel fashion by the hoops or rings 10. The meter 11 sets in the housing so provided, the service pipes or branches 12' and 13' being carried up and connected to the terminals of the meter. The service cock 12 is placed in the incoming branch pipe.

The branch pipes are conveniently brought into the housing in horizontal fashion, and are then bent or turned up to meet the meter in the manner well shown in Fig. 1. In those cases in which the walls of the housing are carried down below the horizontal legs of the service pipes, it is necessary to pass such legs through the walls of the housing. This means the use of a special construction and additional labor and expense of installation. By terminating the wall of the housing at a point above the service branches in the manner shown in Fig. 1, the cost of the walls of the housing is correspondingly reduced, and the use of a special construction for passing the service pipe branches is eliminated. Then by cutting the floor of the housing down to a point below the lower edge of the wall as shown by the broken line 31 in Fig. 1, the service pipe branches are uncovered in their horizontal portions, as well as vertical legs, and additional volume or capacity is given to the interior of the housing. However, an added benefit is this, that the area of earth exposed to the interior of the housing is increased by the amount of the wall portion so added, so that the area of earth which will radiate heat into the interior of the housing is also increased, thus greatly improving the heat efficiency of the housing and still further preventing any possibility of frosting the meter and pipes.

The cover 13 is set onto and covers over the upper portion of the housing. Examination of Fig. 1 shows that the interior of the vault or housing lies wholly below the ground level 30, so that the cover 13 is also below the ground level. This cover is provided with an upstanding neck 14 above the meter 11, and in some cases it is also provided with another upstanding neck 15 above the cock 12. For purposes of convenience, these necks will be designated the meter and cock necks. These necks extend up practically to the ground level. The lids 18 and 26 are provided for the upper portions of the necks for closing the housing. A ledge or sill 14' is provided near the lower portion of the neck 14 for the accommodation of an inside lid 14'', and a ledge or sill 15' is provided near the portion of the neck 15 for the accommodation of an inside lid 15''. These inside lids, in conjunction with the upper lids, serve to provide dead air spaces so as to very materially reduce any radiation of heat from the interior of the housing or vault. No locking devices are necessary on the inside lids, inasmuch as the outside lids are locked in the manner presently to be explained.

When the two neck arrangement is used, the meter neck should be located above the meter and the cock neck above the location of the cock. On account of the presence of the service pipe branches 12' and 13' and the meter 11, it will be very difficult, if not impossible, to reach the cock 12 from the neck 14, thus making it practically necessary to open the neck 15 in order to reach the cock 12. Furthermore, on account of the comparatively small size of the cock neck 15, and on account of its location, it will be practically impossible for a plumber or other operative to tamper with the meter through the cock neck 15.

In the particular constructions shown in Figs. 1 and 2, the necks 14 and 15 are circular in form and the covers 18 and 26 are, therefore, also circular.

Means are provided for locking the lids to their respective necks. I will first describe the particular constructions shown in Figs. 1, 2, 3, 4, and 5. In the case of this construction, the lids 18 and 26 are provided respectively with lugs or lips 19 and 19' which flare outwardly and are adapted to engage the under faces of lips 16 on the upper portions of the respective necks. A locking device 20 is provided on each lid at a point opposite to the lip or lug 19 or 19' of the corresponding lid, which locking devices 20 are also adapted to engage with the lips 16 on the upper portions of the respective necks.

Where the circular form of neck and lid is used, the lugs or lips 19 and 19' are conveniently located at points diametrically opposite to the corresponding locking devices 20. Furthermore, the lips 16 on the necks may be either continuous or discontinuous, but ordinarily they will be discontinuous, occupying only a portion of the circumference of the circular neck.

The particular locking device 20 is shown in detail in Figs. 3, 4, and 5. It comprises a cam block 23 rotatably mounted in the lid and having a sidewise extending cam shoe 24 on its lower end, which cam shoe, when turned into the outer position illustrated in Fig. 3, serves to very firmly engage the under face of the lip 16 by a wedging action to thereby securely draw the lid down onto the neck. A square or angular operating head 21 is secured or connected to the upper portion of the cam block 23, and this operating head 21 works within a recess or opening 22 in the upper face of the lid, as will be well appreciated from Figs. 1, 2, 3, and 4. The operating head 21 is provided with a countersunk or inwardly beveled recess 28 which accommodates the upper square or angular head 28 of the cam block 23. The cam block itself is preferably made of brass or other soft or malleable material, whereas the operating head 21 may be made of relatively hard material, such as cast iron. By the use of this arrangement, it is possible, by simply driving the operating head and cam block together, to cause the block 28 to swage or expand outwardly and occupy the undercut or beveled portion of the opening 27 so as to absolutely lock the parts together in a manner which will be well understood from an examination of Figs. 3 and 4. In order to facilitate this action, the operating head 21 may be provided with a bead or rib opposite to the central portion of the head 28, which bead or rib will help to expand the head and force the material over sidewise into the undercut or beveled portions of the opening 27.

As shown in Fig. 5, the shoe 24 is conveniently made of segmental formation, occupying only a portion of a circle, thereby making it possible for said shoe to drive or wedge under the lip 16.

As previously mentioned, the housing itself may be built up in any suitable manner, as, for example, from staves 9 in the manner shown in Fig. 1, or by the use of specially formed slabs 29, as shown in Fig. 8. These slabs are provided with interlocking tongues 29' and grooves 29'', so that in building up the housing it is only necessary to slip the sections into the locking engagement with each other. It will be understood that I do not confine myself to this or any other form of construction.

Referring to Figs. 6 and 7, I have therein illustrated modified forms of covers and necks, the cover and neck of Fig. 6 being of rectangular form, and those of Fig. 7 being of oval form. The lids used in conjunction with these covers should be of form similar to the necks on which they seat. As previously mentioned, the rectangular form presents for some purposes the advantage with respect to the circular or curved form that the operative can pass his arms down through the diagonally opposite corners of the opening in order to reach the meter so as to lift the same out, or set the same in place, thus making it possible to properly manipulate and gain access to the interior of the housing or vault by the use of a construction having a minimum area of lid exposed to the weather. It is to be observed that there is no possibility of the lids rotating on their necks where rectangular or oval, or other than circular, necks are used, and in this connection it is not necessary to place reliance upon the locking devices for prevention of such rotation.

However, even aside from this construction, it is impossible for the lids to rotate on their respective necks where locking devices are used, because said locking devices gives such a firm and solid connection of the lids to the necks that it is quite impossible for the lids to rotate under any circumstances.

The cover and locking device construction shown in detail in Figs. 9 to 14 inclusive is, in some respects, different from that already described. In the present case, the locking or cam block 34 is provided with the two oppositely disposed projections 35 and 36. The projection 35 has a flat upper surface and a cam-shaped under surface, whereas the projection 36 has a cam-shaped upper surface. Furthermore, the projection 35 is located at a considerably higher elevation than the projection 36. The flat upper surface of the projection 35 is adapted to rest or seat under a curved lug 17' on the lid so as to give support to that side of the cam block. Thereupon when the cam projection 36 is forced under the lip 16' on the neck to draw the lid home, the cam block will be so supported that it cannot be deflected to one side.

The lip 16' is provided on its upper face with a cam or beveled surface 38, so that upon reversing the position of the cam block 34, the cam surface on the under side of the projection 35 will ride up onto the beveled surface 38 to thereby forcibly raise the lid away from the neck even against frosting, rusting, or any other resisting action. This fact is well illustrated in Fig. 10.

Figure 13:
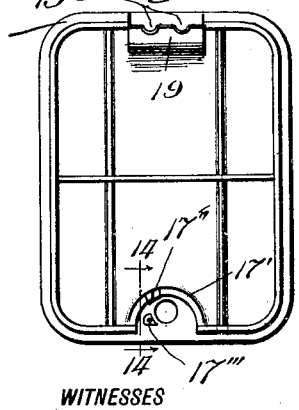
Fig. 13 shows a bottom face view of the lid of the arrangement shown in Figs. 9 and 10, the cam block being removed.
Figure 11:
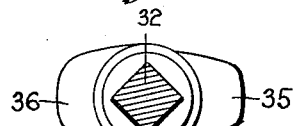
Fig. 11 shows a plan view of the cam block of the locking device shown in Figs. 9 and 10.
Figure 14:
Fig. 14 shows an enlarged detail section taken on the line 14—14 of Fig. 13 looking in the direction of the arrows.
Figure 12:
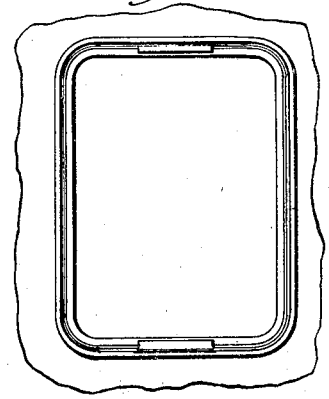
Fig. 12 shows in plan view the cover neck of the arrangement shown in Figs. 9 and 10.

Reference to Fig. 13 shows that the lugs 17' is of arcuate form. On it is provided a stop 17'', against which the projection 35 bears in order to limit movement of the cam block 34 in the locking direction. Another stop 17'''' is provided for limiting the movement of the projection 35 in the other direction, to thereby prevent the cam block 34 from being moved beyond the position shown in Fig. 10. The stops 17'' and 17'''' are so positioned that the cam block 34 is permitted to have approximately one-half revolution between its extreme limits of movement. It is to be observed that, although the projection 35 of the cam block 34 must necessarily pass one or the other of the stops 17'' and 17'''' in moving the cam block, still this is permitted because of the fact that the projection 36 is at a lower elevation than the projection 35.

Figure 10:
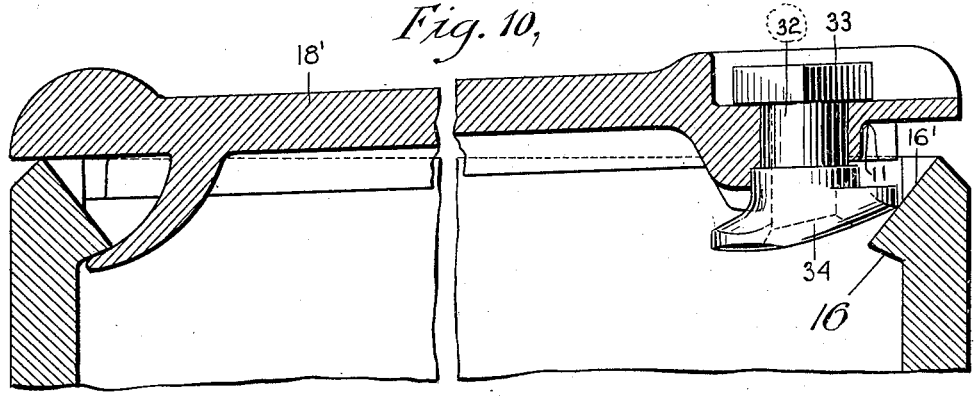
Fig. 10 shows a view similar to Fig. 9, with the exception that the lid is in unlocked position.

The locking device shown in Figs. 9 and 10 is operated by the operating head 33 of angular formation. The locking device 34 is for this purpose provided with a neck that extends up through a suitable opening in the cover. The operating head 33 is preferably formed as the upper end or head of a pin which passes down through the entire cam block to the lower surface thereof, the cam block being provided with a counterbore or recess on its lower surface into which the lower end of the cam block pin can be swaged or riveted, as shown by the dotted lines in Figs. 9 and 10. In order to permit of accomplishing this result, the operating head 33 and its pin should be made of malleable iron or brass, so that it can be worked in the manner above explained, and the cam block 34 may be made of bronze or other suitable material. By using malleable iron for the operating head 33 and its pin, the tendency of thieves to steal or make away with the upper end of the locking device is eliminated because this material is not as valuable as brass which has been frequently used in the past.

Referring to Fig. 13, it will be observed that the lip 19 therein illustrated is provided with a pair of notches or recesses 19' in its lower edge. These notches or recesses permit of the escape of dirt and the like when the lid is forced under the lip 16 on the neck of the cover throat so that this device is largely self-cleaning.

Referring particularly to Fig. 1, it will be observed that the lips 14' and 15' are beveled or slanted in such way that the inner lids 14" and 15" are self-centering when set into place.

I wish to observe that, while in certain of the disclosures, I have shown a circular neck as being used with a circular cover, in other disclosures a rectangular neck as being used with a rectangular cover, and in other disclosures an oval cover as being used with an oval neck, still these various shapes of necks can manifestly be used with other shapes of covers than those on which they are illustrated. For example, a rectangular neck could manifestly be used with a circular cover to great advantage in some cases. Therefore, I do not limit myself to the combinations illustrated.

I claim:

1. In a meter box, a cover having an upwardly extending neck, a lid therefor, and means for locking the lid to the neck comprising a bolt passing through the lid and having an angular projection on its upper end for engagement by a suitable operating tool, and a cam block on its lower end secured to the bolt, said cam block having a pair of laterally projecting lugs at different elevations, the upper lug having a cam surface on its lower face, and the other lug having a cam surface on its upper face, an inwardly projecting lip on the neck for engagement respectively by said cam faces, for the purpose specified.

2. The combination with a horizontal underground service pipe, of a vault into which the horizontal end portions of the service pipe extend, a pair of service pipe branches upwardly extending into said vault, a meter between the upper ends of said service pipe branches, a service cock in one of the horizontal arms of the service pipe, an inclosing wall for the sides of the vault, a cover on the upper edge of said wall, separate upwardly extending necks on the cover in alinement with the meter, and the service cock respectively, lids for said necks located substantially at the ground line and separate locks for securing said lids to the respective necks, substantially as described.

3. The combination with a horizontal service pipe, of a vault into which the horizontal end portions of said pipe extend, a meter between said end portions and within the vault, a service cock on one of said horizontal end portions, a cover for the vault, separate upwardly extending necks on the cover in alinement with the meter, and cock respectively, separate lids on the upper ends of said necks located substantially at the ground line and locks for said lids, substantially as described.

4. The combination with a vault, of a lid on the upper portion of the same, an upwardly extending neck on the lid, an inwardly projecting lip on the neck, and a locking device on the lid for engagement with said lip, said locking device comprising a cam block for engagement with the lip, and a malleable iron pin extending through the lid and having its lower end connected to the cam block and its upper exposed end of angular formation for the purpose specified.

5. The combination with a neck of the class described, of a cover for the upper portion of the same, and locking and manipulating means therefor comprising a reversible cam block, means for turning said cam block from the exterior of the lid, and means for limiting the movement of the cam block through a predetermined angle of rotation, the cam block having a pair of projections at different elevations, one for locking engagement with the lower portion of the lip on the neck, and the other for opening engagement with the upper portion of the lip, substantially as described.

DWIGHT P. CHILD.